United States Patent

Pasieka

[15] 3,696,716
[45] Oct. 10, 1972

[54] IDENTIFICATION CARD CAMERA SYSTEM CAPABLE OF PRODUCING CARDS HAVING DIFFERENT FORMATS

[72] Inventor: John F. Pasieka, Acton, Mass.

[73] Assignee: Polaroid Corporation, Cambridge, Mass.

[22] Filed: Oct. 8, 1969

[21] Appl. No.: 864,632

[52] U.S. Cl. ................................................95/1.1
[51] Int. Cl. .............................................G03b 17/24
[58] Field of Search........................................95/1.1

[56] References Cited

UNITED STATES PATENTS

| | | | |
|---|---|---|---|
| 2,807,198 | 9/1957 | Resnik | 95/1.1 |
| 3,125,936 | 3/1964 | Abell | 95/1.1 |
| 2,827,832 | 3/1958 | Patterson | 95/1.1 |

*Primary Examiner*—John M. Horan
*Attorney*—Brown and Mikulka, William D. Roberson and Robert L. Berger

[57] ABSTRACT

A camera system which employs an objective lens-shutter element to form an image of a subject positioned exteriorly of the camera on a sheet of photographic material and an arrangement including another lens and a plurality of mirrors, one of which mirrors is pivotably mounted in the optical path between the first mentioned lens and the sheet of photographic material, for forming an image of a data card mounted interiorly of the camera on the same sheet of photographic material. An arrangement, including a polarizing plate adapted to overlie the sheet of photographic material, restricts the light rays intersecting a first area of such material to those from the subject and the light rays intersection a second area of such material to those from the data card. The section of the polarizing plate overlying the first such area has its transmission axis orthogonally aligned with that of the section of the polarizing plate adapted to overlie the second such area. This plate is mounted in the system so as to be replaceable with other such plates on which the separate polarized sections thereof differ in location and/or size. The aforementioned pivotably mounted mirror is adapted to be displaced out of such optical path to facilitate photographing the subject. Other features are included so that when a button is depressed by the operator, a rotating cam first effects the displacement of the polarizing plate against the sheet of photographic material, energizes a data card flash unit, rotates the mirror and finally activates the shutter associated with the subject optics.

30 Claims, 5 Drawing Figures

INVENTOR.
JOHN F. PASIEKA
BY Brown and Mikulka
and
Robert L. Berger
ATTORNEYS

FIG. 2

INVENTOR.
JOHN F. PASIEKA

FIG. 3

INVENTOR.
JOHN F. PASIEKA

FIG. 5

IDENTIFICATION CARD CAMERA SYSTEM CAPABLE OF PRODUCING CARDS HAVING DIFFERENT FORMATS

BACKGROUND OF THE INVENTION

1. Field of the Invention

This invention relates to photography, and more particularly, to an improved camera system adapted to produce identification cards of varying formats.

2. Description of the Prior Art

Frequently it is necessary to present different types of information on a single format. One common requirement of this nature is an identification card which includes both a photograph of the subject and certain printed data concerning the subject and issuing agency. Until recent years, identification cards of this type had generally been produced by first taking a photograph of the subject and later cutting and pasting that photograph onto a card containing the pertinent information in printed form. This type of operation normally resulted in the subject's receiving his identification card a number of weeks after being photographed. Another disadvantage associated with these earlier identification card producing techniques was the continuous hazard that the issuing agency might put a photograph on the wrong card causing considerable confusion in the agency's records. Additionally, if the photograph proved unsatisfactory when returned in fully processed form, it was necessary to recall the subject in order to procure a satisfactory photograph.

Systems are now available which facilitate the simultaneous photographic reproduction of images of the subject and the desired information on a single sheet of photographic material. One such system is presently marketed by Polaroid Corporation of Cambridge, Massachusetts which produces the recorded images on a single photograph in full color in 60 seconds. In another 60 seconds, the card produced by that camera system can be laminated with an overlay of transparent plastic material and sealed in a protective transparent pouch. There is no need to recall the person at a later date for a retake because the card did not turn out perfectly. The subject leaves with a positive, permanent means of identification. A temporary card is not required, nor is there any delay waiting for the completed card to be delivered. Also, there is no expense in handling the card at a later date, such as costs associated with obtaining records from files and card delivery or pick-up.

No special skills are required to operate identification card systems of this type, which can be run by anyone who has the manual dexterity to manage a simple office machine. Such a system can provide as many as 200 sealed full color identification cards in a period of 1 hour.

These systems are presently enjoying extensive use in a number of states for purposes of producing drivers licenses. Additionally, they are being employed by numerous government agencies, colleges and private companies to provide tamper-proof means of identification.

Systems of this type are generally designed to produce identification cards having a fixed format. More specifically, each system produces an identification card of a given size on which both the size and position of the subject image are fixed. Obviously, it would be highly advantageous if such systems were adapted to produce identification cards having varying formats. For instance, different users may each have a single requirement with respect to the size and location of the subject's image on the data card, but their requirements in this respect may differ one from the other. Consequently, it is highly desirable that the manufacturer be able to make simple inexpensive variations in a basic system configuration to satisfy the special requirement of each such user. Also certain users are interested in producing identification cards for different purposes wherein the size and/or location of the subject's image is changed. A system which can be modified, when desired, to change the identification card format would greatly reduce the capital expenditure which such users make in order to meet such demands.

One of the objects of this invention, therefore, is to provide an improved identification card camera system.

Another primary object of this invention is to provide an improved camera system of the type indicated which includes simple and inexpensive means for changing the location of the subject's image on the identification cards produced thereby.

A further object of this invention is to provide an improved camera system of the type indicated which includes simple and relatively inexpensive means for changing the size of the subject's image on the identification cards produced thereby.

An additional object to this invention is to provide an improved camera system of the type indicated which facilitates the sequential photographing of information imprinted on a data card and the subject.

A still further object of this invention is to provide an identification card camera system which sequentially and automatically facilitates the photographing of information contained on a data card and the subject responsive to the operator's displacement of a single actuating device.

Another object of this invention is to provide an identification card camera system employing a mirror mounted in the optical path between the objective lens associated with the subject and the sheet of photographic material to facilitate the photographing of a data card and which is displaceable out of such optical path to facilitate the photographing of the subject.

Also, an object of this invention is to provide an improved identification card camera system of the type indicated employing a unique camming mechanism to facilitate the sequential photographing of a data card and the subject.

SUMMARY OF THE INVENTION

In its illustrated preferred embodiment, the camera system of this invention is adapted to photographically produce an identification card having a first section on which a photograph of the subject is presented and a second section on which certain information concerning the subject and the issuing agency is presented. Importantly, this system is adapted to produce identification cards of differing formats.

One section of the camera comprises a film holder adapted to mount a sheet of unexposed photographic material at a predetermined focal plane. A container having a light sealed entrance port serves to removably receive a data card into the camera system and to mount that data card at the appropriate location for purposes of photographing.

An image of the subject is formed on the sheet of photographic material by an objective lens-shutter element. A system including a plurality of mirrors, an objective lens and an electronic flash unit facilitates the formation of a data card image on the same sheet of photographic material. One of these mirrors is positioned in the optical path between the aforementioned lens-shutter element and the sheet of photographic material at the time of recording the data card image. This mirror is mounted within the camera system so that it may be displaced out of such optical path to facilitate the subsequent photographing of the subject.

In order to preclude light rays from the subject intersecting that section of the photographic material on which the data card image is intended to be formed and to preclude light rays from the data card from intersecting that section of the photographic material on which the image of the subject is intended to be formed, the system employs a special arrangement of polarizing elements. Included in this special arrangement is a polarizing plate having two sections of polarizing materials, the transmission axes of these two sections being orthogonally aligned with respect to each other. One such section of the polarizing plate is adapted to overlie the section of the photographic material on which the image of the subject is intended to be formed, while the other such section of the polarizing plate is adapted to overlie the section of photographic material on which the image of the data card is intended to be formed. This polarizing plate is readily replaceable with another such plate wherein the two sections of polarizing materials have a different size and/or a different orientation with respect to each other.

Thus, utilizing one such polarizing plate this camera system may be employed to produce an identification card of a given format. In this connection, the aforementioned electronic flash unit is energized to first form an image of the data card on a first section of this sheet of photographic material. After the mirror, which is initially positioned in the optical path between the lens-shutter element associated with the subject and the sheet of photographic material, has been displaced into a position out of that optical path, the shutter of that element is activated to form an image of the subject on a second section of the sheet of photographic material.

A unique camming mechanism is employed in this system to sequentially displace the polarizing plate into contact with the sheet of photographic material, fire the electronic flash unit thereby illuminating the data card, displace the mirror out of the optical path of the lens-shutter element and to activate the shutter associated with that lens-shutter element.

By replacing the polarizing plate and employing a different form of data card, this system can be quickly adapted to produce identification cards having a different format. In this connection it is also necessary to make a slight adjustment in the alignment of the camera's aiming light. Also, the distance between the camera and subject may be adjusted to accommodate changes in the size of the subject's image.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF A PREFERRED EMBODIMENT

Figure 1:
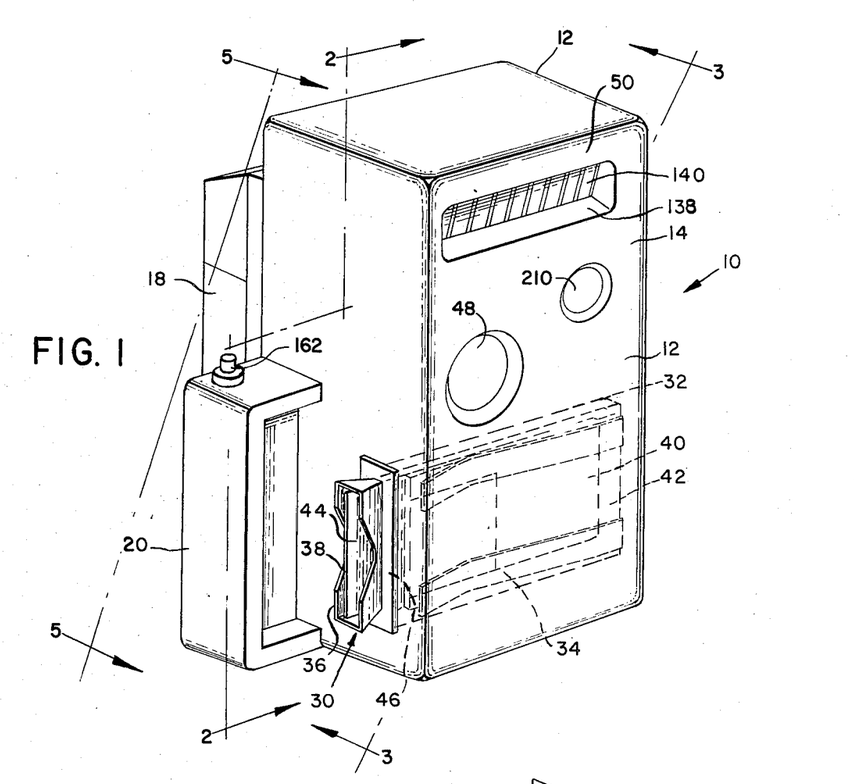
FIG. 1 is a diagrammatic perspective view of a camera system incorporating the features of the present invention.

The illustrated preferred embodiment of this invention may best be understood by first referring to FIG. 1 of the drawings which illustrates a camera system 10 capable of photographically producing identification cards depicting a photograph of the subject and certain information concerning the subject and the issuing agency.

This camera system 10 comprises an opaque housing or shroud 12 including a first section 14 in which the camera's optical system is contained and a film holder 18 removably connected thereto. Extending from one side of the camera's first section 14 is a handle 20 designed to be gripped by the operator for purposes of aiming and/or supporting the camera 10 during exposure operations. Preferably, the film holder 18 is adapted to receive a film pack 22 containing a plurality of film units (See FIG. 2), which may advantageously be of the diffusion-transfer processing type, and to sequentially position the negative emulsion bearing photographic sheet 24 of each such film unit at a focal plane 26 within the camera 10. Also housed within the film holder 18 are means (not shown) for effecting the application of a processing fluid between the negative emulsion bearing sheet 24 and an image-receiving sheet of each film unit after exposure and as the film unit is withdrawn from the holder by the operator's pulling a tab 28 connected thereto. The specific forms of the film holder 18 and the film units contained in the film pack 22 do not constitute part of the present invention and, for instance, may be identical to those of such items currently being marketed.

The first section 14 of the camera system 10 also includes a data card receiving and mounting arrangement 30 which facilitates the removable insertion of a card on which certain information is imprinted into the camera for purposes of photographing same. This arrangement 30 comprises a container 32 which is mounted within the camera system 10 by a spring clip 34 (Also See FIG. 2) and which is provided with an elongated fluted opening 36 through which a data card 38 may be inserted thereinto. When fully inserted into the container 32, a portion 40 of the data card on which the information is imprinted is located in a section 42 of that container so as to be properly positioned for photographing. At such time, a second portion 44 of the data card 38 is accessible exteriorly of the camera system 10 adjacent the elongated fluted opening 36 to facilitate the subsequent removal of the card from the system. The container 32 includes a light sealed chamber 46 wherein a resiliently flexible material, such as felt, is attached to one wall of the chamber and is adapted to extend across that chamber into contact with the opposite wall thereof. This arrangement permits the data card 38 to be inserted into and withdrawn from the camera system 10 without disrupting the light sealed nature of the container's section 42. An identification card camera system employing this unique type of data card receiving and mounting arrangement is the subject of copending application Ser. No. 864,630 of Donald E. Moodie filed Oct. 8, 1969 and is described in greater detail therein.

Figure 2:
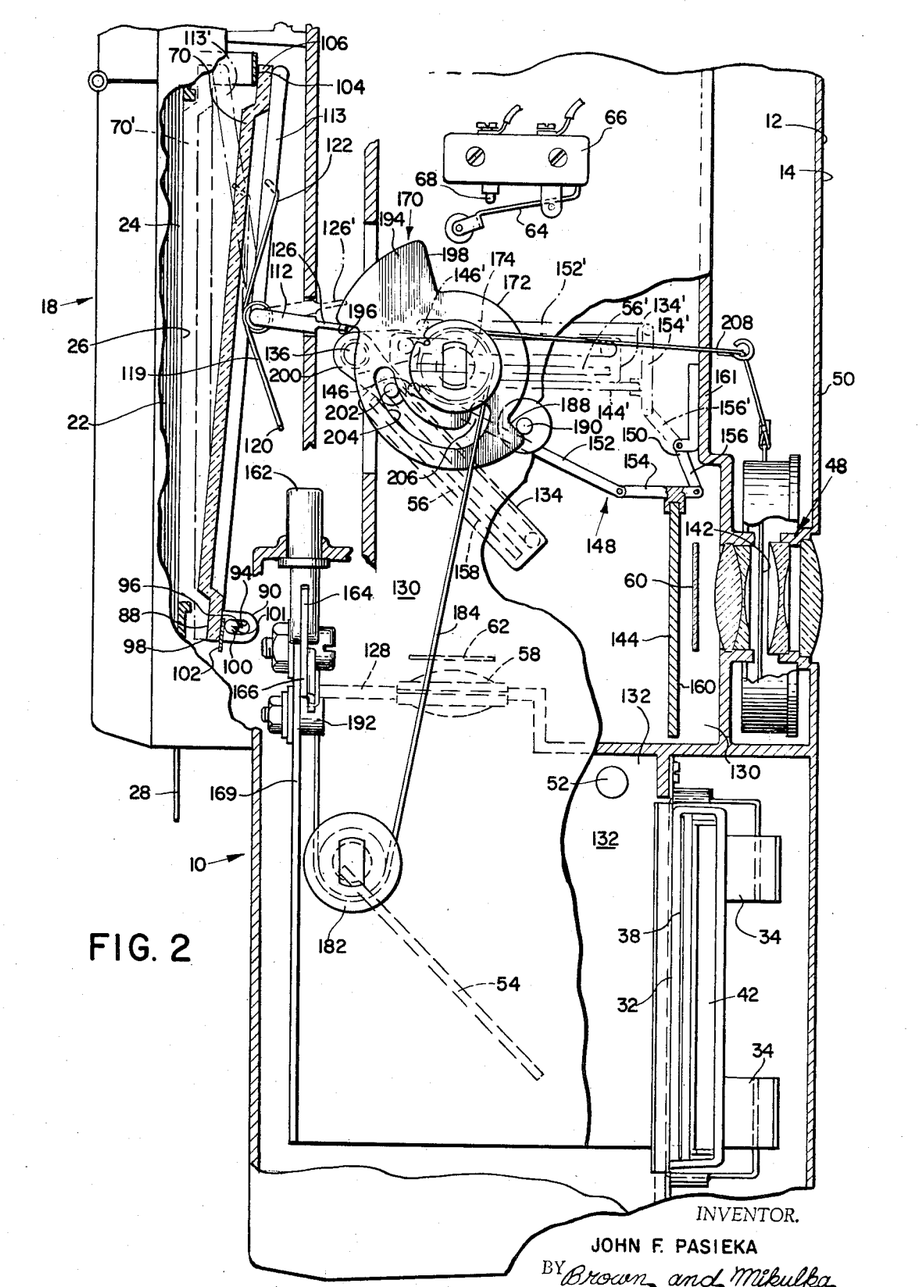
FIG. 2 is a fragmentary diagrammatic partially cutaway, partially sectional, side elevation view taken generally along line 2—2 of FIG. 1.

FIG. 2 diagrammatically illustrates the optical system housed within the section 14 of the camera 10 and the operable relationship between that optical system, the data card 38 and the sheet of photographic material 24. In this figure of the drawings, the data card 38 is shown as being positioned within the camera system 10 at the proper location for photographing purposes. It will be noted that, in this embodiment, the information appearing on the data card 38 and intended to be photographically reproduced on the photographic sheet 24 is located on the generally "L-shaped" portion 40 of the card.

An objective lens-shutter element 48 is mounted in the front face 50 of the camera system 10 to facilitate the formation of an image of a subject positioned in front of the camera on a selected section of the photographic sheet 24.

It will be noted that, when mounted in the camera system 10, the data card 38 is located below both the lens-shutter element 48 and the sheet of photographic material 24. Thus, in addition to an electronic flash unit 52, which serves to illuminate the data card 38, the camera 10 employs first and second light reflecting elements (mirrors) 54 and 56 and an objective lens 58 to facilitate the formation of an image of the data card on the sheet of photographic material 24.

Mounted adjacent the objective lens-shutter element 48 so as to intercept all of the light rays from the subject passing through that element is a light polarizer 60. Similarly, a second light polarizer 62 is mounted adjacent the objective lens 58 so as to intercept all of the light rays from the data card 38 passing through that element. Importantly, the transmission axes of these two polarizers 60 and 62 are orthogonally aligned with respect to each other. The purpose for this arrangement will subsequently be explained in detail. At this point it should be noted that the flash unit 52 is energized through a conventional circuit (not shown) whenever the arm 64 of a microswitch 66 is seated against the contact 68 of that switch.

Figure 4:
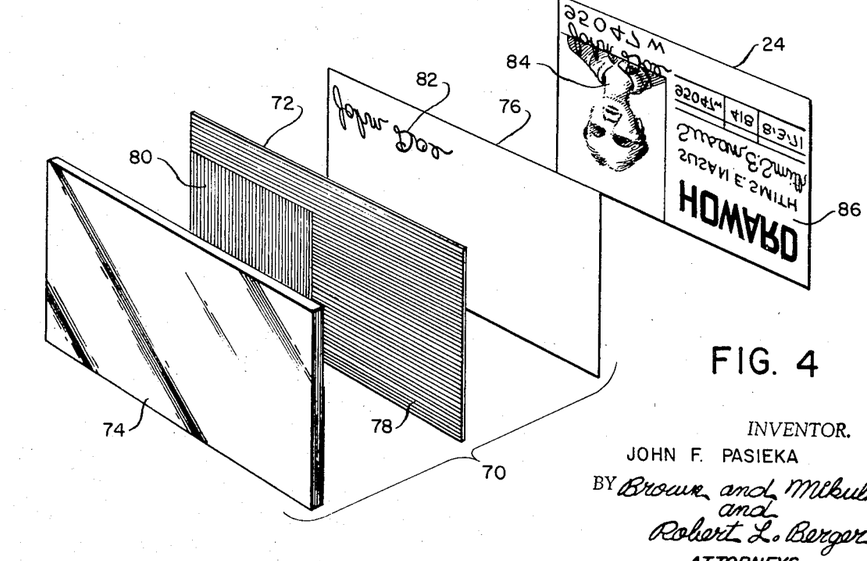
FIG. 4 is a diagrammatic exploded perspective view of the validation and polarizing plate forming part of the camera system of FIG. 1 and illustrating the operable relationship between that plate and a sheet of photographic material mounted in such system.

As best seen in FIG. 2, the camera system 10 is provided with a polarizing plate 70 which is adapted to be displaced into its position shown in phantom, wherein it is seated against and overlies the sheet of photographic material 24, prior to the time the images of the data card 38 and the subject are formed on the photographic sheet. In FIG. 4 of the drawings, this polarizing plate 70 has been exploded to more clearly illustrate the various components of which it is formed. As shown therein, a sheet 72 of polarizing materials is sandwiched between a pair of transparent support plates 74 and 76. As indicated, the polarizing plate 70 overlies and is positioned in close proximity to the sheet of photographic material 24 when the subject and data card are being photographed. Consequently, the sheet of polarizing material 72 may have approximately the same dimensions as the finished identification card. In the illustrated embodiment, this sheet 72 comprises a first generally "L-shaped" section 78 having its transmission axis aligned with that of the second light polarizer 62 and a rectangularly shaped section 80 having its transmission axis aligned with that of the second light polarized 62 and a rectangularly shaped section 80 having its transmission axis aligned with that of the light polarizer 60. The former section 78 has the same size and shape of a section 86 of the photographic sheet 24 which it is adapted to overlie and on which the data card image is intended to be recorded, while the latter section 80 has the same size and shape of a section 84 of the photographic sheet 24 which it is adapted to overlie and on which the subject's image is intended to be recorded. Conventional means may be employed to fabricate the sheet of polarizing materials 72. For instance, this sheet 72 may comprise a lamination of polyvinyl alcohol sheets, each having been stretched and molecularly oriented so as to be birefringent, appropriately dyed and printed in accordance with current techniques to provide the aforementioned sections 78 and 80 having orthogonally aligned transmission axes. Alternately, other conventional forms of polarizing sheet material may be cut, aligned and mounted on a suitable transparent support.

The support plates 74 and 76 may be formed with any suitable material, such as an acrylic lucite or a glass, and appropriately adhered to the opposed faces of the sheet 72. These support plates 74 and 76 not only serve to support the sheet of polarizing materials 72 but also serve to protect that sheet from foreign matter, abrasion, etc. Also, the support plate 76 may be provided with indicia 82, such as a validating signature, company name, trademark or other symbol, which it is intended to photographically reproduce on the sheet of photographic material 24. In this respect, such indicia may be hot stamped in an opaque ink into a surface of the support 76. Preferably, it would be stamped into the surface of that support plate 76 intended to be mounted adjacent the sheet of photographic material 24 and at a position thereon where it would be recorded in part on the section 84 thereof and in part on the section 86 thereof. When disposed in its position shown in phantom in FIG. 2 of the drawings, the plate 70 is mounted against the sheet 24 so that the sections 78 and 80 of its sheet of polarizing materials 72 respectively overlie the sections 86 and 84 of the photographic sheet 24. To minimize any distortion of the images, it is desirable that the support plate 76 be relatively thin.

It will thus be appreciated that the polarizing plate 70, in combination with the light polarizers 60 and 62, serves to effectively limit the light rays intersecting section 84 of the sheet of photographic material 24 to those from the subject and to limit the light rays intersecting section 86 of the sheet of photographic material to those from the data card 38. This particularly advantageous system for effecting such a result is the subject of copending application Ser. No. 864,671 of Bruce K. Johnson filed on Oct. 8, 1969.

In order to reduce the pull force which must be exerted by the operator on the tab 28 to effect the removal of each film unit from the film holder 18 and, further, to preclude scratching the exposed surface of the photographic sheet 24 at such time, it is desirable that the polarizing plate 70 be positioned out of contact with an exposed photographic sheet whenever such a sheet is being withdrawn from the film holder. Consequently, the polarizing plate 70 is mounted within the camera system 10 for selective displacement between its original position as shown in FIG. 2 of the drawings and its position as shown therein in phantom. In this connection, one end 88 of the polarizing plate 70 is provided with a pair of projections 90 extending in spaced apart parallel relationship. Each of these projections 90 is provided with an elongated aperture 94. The spacing between the projection 90 is such that they fit over a flange 96 extending from a structural member 98 of the film holder 18. A pin 100, passing through a bore 101 of the flange 96 and the elongated apertures 94 of the projections 90, serves to pivotably connect the polarizing plate 70 to the structure of the film holder 18. It will be recognized that this mounting arrangement facilitates the ready removal of the plate 70 from the system 10 and the replacement thereof with a similar type member which, if desired, may comprise a polarizing sheet 72 of a different format. Mounted from the structural member 98 is a leaf spring 102 which acts against the polarizing plate 70 adjacent its projections 90 to continually urge the end 88 of that plate in the direction of the sheet of photographic material 24. Another leaf spring 104 mounted on the structural member 98 acts against the other end 106 of the polarizing plate 70 to continually urge that end of the plate in a direction away from the sheet of photographic material 24.

Figure 5:
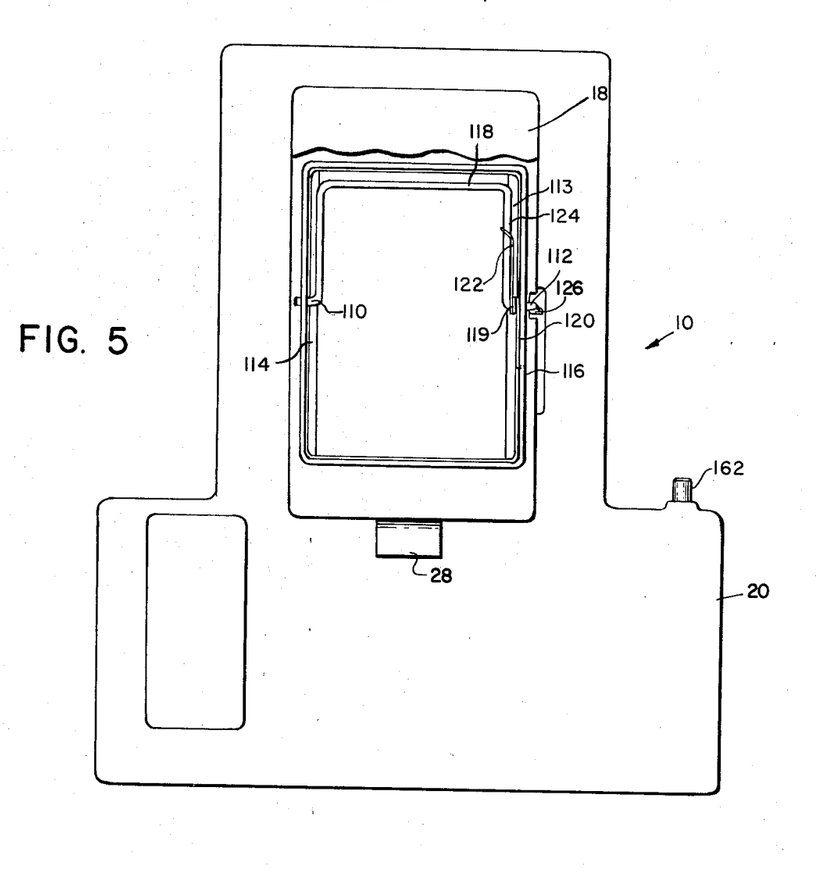
FIG. 5 is a diagrammatic, partially cutaway, rear elevation view taken generally along line 5—5 of FIG. 1 illustrating certain aspects of the camera's mounting arrangement for the validation and polarizing plate.

Outwardly extending arms 110 and 112 (Also See FIG. 5) of a bail 113 pass through circular bores appropriately provided through frame members 114 and 116, respectively, of the film holder 18. In order to continually urge the upper section 118 of the bail 113 against the end 106 of the polarizing plate 70, a coiled spring 119 is mounted around the outwardly extending arm 112, having one end 120 thereof affixed to the frame member 116 and its other end 122 acting against a leg 124 of the bail. The coiled spring 119 is selected so that it exerts a greater force against the polarizing plate 70 than is exerted against that member by the leaf spring 104 so that the net effect of these springs is to tend to displace that member into its position shown in phantom in FIG. 2 of the drawings. The bail's outwardly extending arm 112 makes a right angle turn in the direction away from the polarizing plate 70 and terminates in a flattened lip 126. It will be appreciated that, when a force is exerted against this flattened lip 126 causing that member to be positioned in its location shown in FIG. 2 against the forces exerted on the polarizing plate 70 by the springs 119 and 104, the polarizing plate will be positioned in spaced apart relationship to the sheet of photographic material 24. Further, if no such force is exerted against the flattened lip 126, the forces exerted on the polarizing plate 70 by the springs 102 and 119 will cause the polarizing plate to be located in its position as shown in phantom in FIG. 2, i.e., in contact with and overlying the sheet of photographic material 24. The elongated apertures 94 provide a "floating" characteristic to the polarizing plate 70 and accommodate variations in the alignment of, or position of, the different sheets of photographic material 24 comprising the film pack 22 to continually effect firm and uniform contact between the polarizing plate and the photographic sheets whenever that plate is displaced into contact therewith.

It will be noted that the data card objective lens 58 is mounted in an opaque internal wall member 128 of the camera system 10, which wall member effectively serves to divide the first section 14 of that system into two separate chambers 130 and 132. Fixedly positioned within the chamber 132 is the electronic flash unit 52 and the first light reflecting element 54 which, as indicated, in combination with the reflecting element 56, facilitate the formation of an image of the data card 38 on the sheet of photographic material 24. The microswitch 66, which serves to selectively energize the flash unit 52, and the second light reflecting element 56 are mounted within the chamber 130. At the time the data card 38 is photographed, light rays from that card are reflected by the light reflecting element 54 through the lens 58 and the light polarizer 62 onto the light reflecting element 56, which redirects those light rays towards the sheet of photographic material 24. Since at this time the light reflecting element 56 is positioned in the optical path between the objective lens-shutter element 48 and the sheet of photographic material 24, this element 56 is displaced into its position shown in phantom in FIG. 2 subsequent to the formation of the data card image on the sheet of photographic material 24 and prior to the formation of the subject's image on that sheet. In this connection, the light reflecting element 56 is mounted within a frame 134 which in turn is mounted for pivotal movement about a rod 136.

Located in the chamber 130 of the camera system and positioned in operable relationship with an opening 138 in the front face 50 of section 14 is a second electronic flash unit 140 which, in cooperation with the objective lens-shutter element 48, facilitates the photographing of a subject positioned in front of the camera. In this respect, the flash unit 140 illuminates the subject and an image of that subject is formed by the objective lens of the element 48 on the sheet of photographic material 24. A conventional arrangement may be employed to energize the flash unit 140 whenever the shutter 142 of the objective lens-shutter element 48 is activated.

As in the case of the film holder 18, the film units contained therein and the arrangement for activating the shutter 142, the lens element 58 and the lens-shutter element 48 and the flash units 52 and 140 do not by themselves constitute a part of the present invention. Consequently, these components of the system may take conventional or special forms other than as illustrated in the drawings within the scope of the present invention.

In order to preclude light rays from being reflected by the element 56 onto the sheet of photographic material 24 during the time that the subject is being photographed, the camera system 10 includes a non-reflective light baffle plate 144. More specifically, one end 146 of a linkage 148 is pivotably connected to the mounting frame 134 while the other end 150 thereof is pivotably connected to the structure of the camera system 10. The linkage 148 includes arms 152, 154 and 156, with the arm 154 pivotably connected between the arms 152 and 156. The light baffle plate 144 is fixedly connected to, and extends from, the linkage arm 154. It will thus be appreciated that, as the like reflective element 56 is rotated in a counterclockwise direction about the rod 136 as viewed in FIG. 2 of the drawings towards its position shown in phantom therein, the frame 134 in which that element is mounted engages the arm 152 and causes the light baffle plate 144 to be displaced in a direction towards the reflective surface 158. When the light reflective element 56 has been fully displaced into its position shown in phantom, the light baffle plate has been displaced to its position also shown in phantom wherein it overlies that element's reflective surface 158. The linkage 148 automatically returns the baffle plate 144 to its original position whenever the reflective element 56 is returned to its original position. This plate 144 may be formed of any suitable material such as polypropylene or aluminum having its surface 160 coated with a flat black paint to render it non-reflective. The linkage 148 may comprise a plurality of arms formed of aluminum or any other substantially rigid preferably light-weight material appropriately connected to each other, and to the frame 134 and the camera system's structural member 161. Alternately, the linkage 148 may be formed of a single piece of polypropylene configured to provide living hinges at the appropriate locations to define the arms 152, 154 and 156.

The illustrated preferred embodiment of this invention includes a unique arrangement for automatically and sequentially displacing the polarizing plate 70 into contact with the sheet of photographic material 24, energizing the electronic flash unit 52, displacing the light reflecting element 56 into its position shown in phantom in FIG. 2 and activating the shutter 142, all in response to an operator's manipulation of a single actuating device. In this connection, a button 162 (See FIGS. 1 and 2) is conveniently mounted on the handle 20 which may be depressed by the operator to perform the above noted functions and to thereby record images of the data card 38 and the subject on mutually exclusive sections 86 and 84, respectively, of the sheet of photographic material 24.

Figure 3:
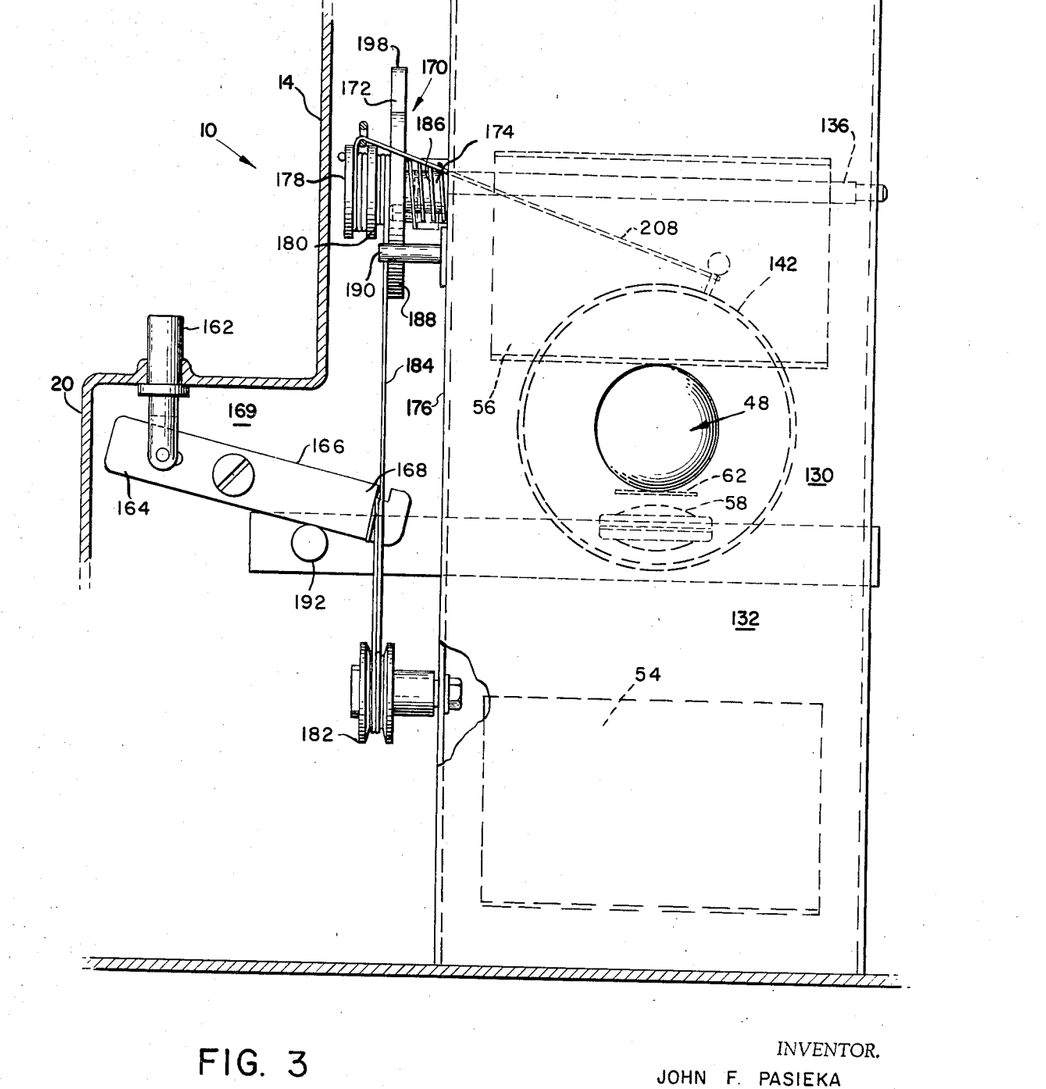
FIG. 3 is a fragmentary diagrammatic sectional front elevation view taken generally along line 3—3 of FIG. 1.

As may be seen in FIGS. 2 and 3 of the drawings, the button 162 is pivotably connected to one end of a lever arm 166, which itself is pivotably connected to a structural member 169 intermediate its ends 164 and 168. A camming mechanism 170 is located within chamber 130 and includes a shaft 174 journaled to a frame member 176 and on which is mounted a cam 172. A pulley 178 is mounted at the end of the shaft 174 being spaced from the cam 172 so as to provide a drum 180 intermediate those two members. Disposed in vertical alignment with the drum 180 is a pulley 182 which is also journaled to the frame member 176. A flexible cable 184 extends around the pulley 182 having one of its ends connected to the end 168 of the lever arm 166 and its other end connected to the drum 180. A spring 186, coiled on the shaft 174, continually urges that member to rotate in a counterclockwise direction as viewed in FIG. 2. Rotation of that shaft 174 in a counterclockwise direction is restricted by a stop 190 extending from the frame member 176 and adapted to engage a leading edge 188 of the cam 172. Another stop 192 is located to restrain further clockwise rotation of the lever arm 166 at such time as the cam's leading edge 188 contacts the stop 190 under the force of the spring 186. It will thus be appreciated that, whenever an operator depresses the button 162, the cam 172 is rotated in a clockwise direction as viewed in FIG. 2 away from the stop 190. Upon subsequent release of the button 162, the force of the spring 186 causes the cam 172 to be returned in a counterclockwise direction to its original position. At such time, the button 162 automatically returns to its original position.

A specially configured section 194 of the cam 172 defines a pair of projecting surfaces 196 and 198. When the cam's leading edge 188 is seated against the stop 190, the former of these surfaces, i.e., projecting surface 196, acting through the lip 126 restrains the polarizing plate 70 in spaced apart relationship with respect to the sheet of photographic material 24. After the button 162 has been depressed a slight amount, for instance, a sufficient amount to effect a 10° rotation of the cam 172, the projecting surface 196 is disengaged from contact with the bail's flattened lip 126 and the force of the spring 119 effects a displacement of the polarizing plate 70 into contact with the sheet of photographic material 24. Further depression of the button 162, for instance, that sufficient to effect another 10° rotation of the cam 172 brings the projecting surface 198 of the cam 172 into contact with the microswitch's arm 64 so as to displace that arm into engagement with the contact 68. During this, for instance, 20° rotation of the cam 172, the light reflective element 56 remains in its original position shown in FIG. 2. Thus, when the cam 172 brings the microswitch's arm 64 into engagement with the contact 68, the electronic flash unit 52 is energized and an image of the data card is recorded on section 86 of the sheet of photographic material 24.

Further displacement of the cam 172 in a clockwise direction, as viewed in FIG. 2, effects a displacement of the light reflective element 56 into its position shown in phantom in that figure. In this connection, the frame 134 for the light reflective element 56 is provided with an arm 200 from which a pin 202 extends into engagement with a cammed track 204 of the cam 172. This cammed track 204 is configured to permit a certain amount of displacement of the pin 202 therealong, as the cam is rotated from its original position into its position where it has effected an energization of the flash unit 52, without causing any displacement of the light reflective element 56. However, after the flash unit 52 has been energized, the pin 202 enters a section 206 of the cammed track 204 which is configured to effect a counterclockwise rotation of the light reflective element 56 into its position shown in phantom in FIG. 2. For instance, the cammed track 204 may be configured to effect such a displacement of the reflective element 56 at such time as the button 162 has been displaced a sufficient distance to effect a 105° rotation of the cam 172 away form the stop 190. It will be recalled that, when the light reflective element 56 is in its position shown in phantom in FIG. 2, the light baffle plate 144 has been displaced into its position shown in phantom in that same figure so as to overlie that element's reflective surface 158.

The shutter 142 may be of a self-cocking type and is connected to the pulley 178 through a flexible cable 208. This connection is such that the shutter 142 is activated shortly after the light reflective element 56 has been pivoted into its position shown in phantom in FIG. 2, for instance, after the button 162 has been depressed a sufficient distance to effect a 120° rotation of the cam 172. It will be recalled that activation of the shutter 142 automatically energizes the electronic flash unit 140 thereby causing an image of the subject to be recorded on the section 84 of the sheet of photographic material 24. When the operator subsequently releases the button 162, that element 162 and the cam 172 are automatically returned to their original positions with the cam's leading edge 188 seated against the stop 190 and the lever arm 166 seated against the stop 192. At such time, the light reflective element 56 has returned to its original position and the cam's projecting surface 196 has engaged the bail's flattened lip 126 to effect a displacement of the polarizing plate 70 into its original position spaced from the photographic sheet 24. Also at such time, the microswitch's arm 64 returns to its original position spaced apart from the contact 68 and the baffle plate 144 is once again disposed in its original position.

When using the camera system 10, the subject is positioned a predetermined distance in front of the camera. To facilitate easy and accurate photographing of the subject, the camera is provided with an aiming light 210 which, for instance, may be adjusted at the factory so that, by aiming its light beam at the subject's forehead, the camera will be properly aligned with the subject for photographing purposes.

This basic camera system may be simply modified to facilitate the production of identification cards having different formats. More specifically, it is only necessary to replace the polarizing plate 70 with a similar type plate comprising a different sizing and/or arrangement of the sections 78 and 80 of its polarizing sheet 72 and making a compensating adjustment in the orientation of the aiming light 210. Normally, such changes would be effected by the manufacturer to meet the requirements of a specific user prior to delivery of the camera system 10. However, where a particularly user has multiple requirements for identification card formats, the necessary changes could be made by a skilled technician, such as a factory field representative, at the user's location. Obviously, each such change would necessitate the use of a different data card format.

Where changes are desired in the size of the subject's image presented on the identification card, an appropriate adjustment would have to be made in the distance that the subject is seated in front of the camera system 10. Obviously, changes of this nature are limited by the field of focus characteristic of the objective lens 48. For instance, one such system producing an identification card 2.75 inches in length by 1.75 inches in height employs a lens 48 having a focal length of 114 mm. with an effective depth of field of 30 inches at its maximum aperture f4.5. In one arrangement of this system, the portion of the card devoted to the subject's image as determined by the polarizing plate 70 is 1.25 inches square. At a nominal subject-to-lens distance of 54 inches, the chin-to-top of head height of the recorded subject's image is 0.75 inches. By changing the subject-to-lens distance to 42.5 inches, the recorded chin-to-top of head height of the subject is increased to 0.95 inches. The total range available for varying the head size of the subject's image is approximately 2 to 1.Thus, the user may first select any one of a variety of subject image field sizes for the identification card and then fill the selected area with an appropriately sized subject image.

OPERATION OF THE PREFERRED EMBODIMENT

To briefly summarize the operation of the preferred embodiment of this invention, the film pack 22 is loaded into the film holder 18 and the leading sheet of photographic material 24 uncovered in accordance with conventional procedures. When the subject arrives to obtain his identification card, the operator or an assistant ascertains the necessary information and types that information onto the portion 40 of the data card 38. This data card 38 is then inserted into the container 32 through its elongated fluted opening 36. When fully inserted into the container 32, the card's portion 40 on which the information intended to be photographically reproduced is imprinted is accurately positioned for photographic purposes.

At such time, the polarizing plate 70, the light reflective element 56, the baffle plate 144 and the arm 64 of the microswitch 66 are disposed in their original positions as illustrated in FIG. 2 of the drawings.

The subject is seated a predetermined distance in front of the camera system 10 and, gripping the handle 20, the operator aims the camera system 10 at the subject and depresses the button 162. Depression of the button 162 automatically and sequentially effects a displacement of the polarizing plate 70 into contact with the sheet of photographic material 24, the energizing of the electronic flash unit 52, the rotation of the light reflective plate 56 out of the optical path between the objective lens-shutter element 48 and the sheet of photographic material, the covering of the surface 158 of the light reflecting element 56 with the baffle plate 144, and then the simultaneous activation of the shutter 142 and the electronic flash unit 140. Thus, in the process of depressing the button 162, images of the data card 38 and of the subject are sequentially recorded on mutually exclusive sections 86 and 84, respectively, of the photographic sheet 24. An image of the indicia 82 on the light transparent support plate 76 is also recorded on the sheet of photographic material 24 so as to appear in part on section 84 thereof and in part on section 86 thereof. When the operator releases the button 162, the polarizing plate 70, the light reflecting element 56, the baffle plate 144 and the microswitch's arm 64 are automatically returned to their original positions.

After these operations have been performed, the operator may pull the tab 28 to withdraw the film unit including the sheet of photographic material 24 from the camera 10 and to simultaneously effect the processing of that sheet 24. Then the data card 38 may be removed from the container 32 and another such card containing information concerning the next subject to be photographed inserted thereinto.

As indicated, the polarizing plate 70 may be replaced with a similar type plate, the polarizing sheet 72 of which has a different format and, if necessary, an appropriate adjustment made in the alignment of the aiming light 210 to facilitate the production of identification cards having a different format.

Those familiar with the photographic arts will readily appreciate the novel and highly unique advantages of this invention. Most importantly, an identification card camera system is provided in which relatively simple changes can be made to accommodate alterations in the format of identification cards produced thereby.

This invention may be practiced or embodied in still other ways without departing from the spirit or essential character thereof. For instance, in the illustrated preferred embodiment, the data card is first photographed and then, after the mirror has been displaced out of the optical path of the subject lens, the subject is photographed. Obviously, in another arrangement of this invention, the subject may first be photographed with the mirror positioned out of the optical path of the subject lens, the mirror then displaced into position for photographing the data card, and then, the data card photographed. It is only necessary that these events occur sequentially. The preferred embodiment described herein is therefore illustrative and not restrictive, the scope of the invention being indicated by the appended claims, and all variations which come within the meaning of the claims are intended to be embraced therein.

I claim:

1. A system for sequentially recording images of two scenes on mutually exclusive areas of a sheet of photographic material, comprising:

an objective lens adapted to form an image of one of such scenes on such sheet of photographic material;

first means for forming an image of the other of such scenes on such sheet of photographic material, said first means including a light reflective element positioned in the optical path between said objective lens and such sheet of photographic material so as to preclude an image of such one scene from being formed on such sheet of photographic material at such times while facilitating the formation of an image of such other scene on such sheet of photographic material at such times and adapted to be displaced into a second position out of such optical path to facilitate the formation of such image of such one scene on such sheet of photographic material, said light reflective element thereby precluding the simultaneous formation of a composite photographic record of such two scenes on such sheet of photographic material;

second means for selectively displacing said reflective element into and out of such optical path; and third means for limiting the light rays intersecting a first such area of such sheet of photographic material to those from such one scene and for limiting the light rays intersecting a second such area of such sheet of photographic material to those from such other scene.

2. A system for sequentially recording images of two scenes on mutually exclusive areas of a sheet of photographic material, comprising:

an objective lens adapted to form an image of one of such scenes on such sheet of photographic material;

first means for forming an image of the other of such scenes on such sheet of photographic material, said first means including a light reflective element positioned in the optical path between said objective lens and such sheet of photographic material and adapted to be displaced into a second position out of such optical paths to facilitate the formation of such image of such one scene, said light reflective element thereby precluding the simultaneous formation of a composite photographic record of such two scenes on such sheet of photographic material;

second means for selectively displacing said reflective element into and out of such optical path;

third means for limiting the light rays intersecting a first such area of such sheet of photographic material to those from such one scene and for limiting the light rays intersecting a second such area of such sheet of photographic material to those from such other scene; and fourth means for preventing light rays from being reflected by said light reflective element when located in its said second position.

3. The system of claim 2 wherein said fourth means comprises a displaceably mounted non-reflective baffle plate connected to said light reflective element.

4. A system for sequentially recording images of two scenes on mutually exclusive areas of a sheet of photographic material, comprising:

an objective lens adapted to form an image of one of such scenes on such sheet of photographic material;

first means for forming an image of the other of such scenes on such sheet of photographic material, said first means including a light reflective element positioned in the optical path between said objective lens and such sheet of photographic material and adapted to be displaced into a second position out of such optical path to facilitate the formation of such image of such one scene;

second means for selectively displacing said reflective element into and out of such optical path; and third means for limiting the light rays intersecting a first such area of such sheet of photographic material to those from such scene and for limiting the light rays intersecting a second such area of such sheet of photographic material to those from such other scene, said third means including:

a first filter element positioned to intercept substantially all of the light rays passing through said objective lens from such one scene;

a second filter element having a different filter factor than that of said first filter element positioned to intercept substantially all of the light rays directed towards such sheet of photographic material from such other scene;

a third filter element having the same filter factor as said first filter element removably positioned adjacent and overlying such area of such sheet of photographic material on which such image of such one scene is intended to be recorded; and a fourth filter element having the same filter factor as said second filter element positioned adjacent and overlying such area of such sheet of photographic material on which such image of such other scene is intended to be recorded, whereby said third and fourth filter elements may be readily rearranged with respect to each other or replaced with different sized filter elements having similar filter factors to facilitate various alterations in the format of the images recorded on such sheet of photographic material.

5. The system of claim 4 wherein said second and fourth filter elements comprise a single plate.

6. The system of claim 4 wherein said filter elements are polarizers.

7. A system for sequentially recording images of two scenes on mutually exclusive areas of sheet of photographic material, comprising:

an objective lens adapted to form an image of one of such scenes on such sheet of photographic material;

first means for forming an image of the other of such scenes on such sheet of photographic material, said first means including a light reflective element positioned in the optical path between said objective lens and such sheet of photographic material and adapted to be displaced into a second position out of such optical path to facilitate the formation of such image of such one scene, said light reflective element thereby precluding the simultaneous formation of a composite photographic record of such two scenes on such sheet of photographic material;

second means for selectively displacing said reflective element into and out of such optical path;

third means for limiting the light rays intersecting a first such area of such sheet of photographic material to those from such one scene and for limiting the light rays intersecting a second such area of such sheet of photographic material to those from such other scene; and a shutter operably associated with said objective lens, said second means comprising an actuating device accessible exteriorly of said system for manual operation connected to said shutter and said reflective element to sequentially displace said reflective element and to activate said shutter.

8. The system of claim 7 additionally comprising a camming mechanism through which said actuating device is connected to said shutter and said reflective element.

9. The system of claim 7 additionally comprising a substantially transparent indicia bearing plate mounted for displacement between a first position spaced from such sheet of photographic material into a second position in contact with and overlying said sheet of photographic material and wherein said actuating device is adapted to effect the displacement of said plate from its said first position into its said second position prior to sequentially displacing said reflective element and activating said shutter.

10. The system of claim 9 additionally comprising a camming mechanism through which said actuating device effects the displacement of said plate, the displacement of said reflective element and the activation of said shutter.

11. The system of claim 5 wherein said plate is mounted for displacement between a first position spaced from such sheet of photographic material into a second position in contact with and overlying said sheet of photographic material and wherein said second means comprises an actuating device accessible exteriorly of said system for manual operation operably associated with said plate, said shutter and said reflective element to first effect the displacement of said plate into its said second position and subsequently to sequentially effect the displacement of said reflective element and the activation of said shutter.

12. The system of claim 11 additionally comprising a camming mechanism through which said actuating device effects the displacement of said plate, the displacement of said relative element and the activation of said shutter.

13. A camera system for recording an image of a subject positioned exteriorly of said system and information presented on a data card mounted within said system on mutually exclusive areas of a sheet of photographic material, comprising:

an objective lens adapted to form an image of such subject on such sheet of photographic material;

first means for forming an image of such data card on such sheet of photographic material, said first means including a displaceably mounted light reflective element positioned in the optical path between said objective lens and such sheet of photographic material so as to preclude an image of such subject from being formed on such sheet of photographic material at such times while facilitating the formation of an image of such data card on such sheet of photographic material at such times, said light reflective element thereby precluding the simultaneous formation of a composite record of such subject and such data card on such sheet of photographic material;

second means for selectively displacing said reflective element out of such optical path to facilitate the formation of an image of such subject on such sheet of photographic material; and third means for limiting the light rays intersecting a first such area of such sheet of photographic material to those from such subject and for limiting the light rays intersecting a second such area of such sheet of photographic material to those from such data card.

14. A camera system for recording an image of a subject positioned exteriorly of said system and information presented on a data card mounted within said system on mutually exclusive areas of a sheet of photographic material, comprising:

an objective lens adapted to form an image of such subject on such sheet of photographic material;

first means for forming an image of such data card on such sheet of photographic material, said first means including a displaceably mounted light reflective element positioned in the optical path between said objective lens and such sheet of photographic material, said light reflective element thereby precluding the simultaneous formation of a composite record of such subject and such data card on such sheet of photographic material;

second means for selectively displacing said reflective element out of such optical path to facilitate the formation of an image of such subject on such sheet of photographic material, said second means including an actuating device accessible exteriorly of said system for manual operation and a camming mechanism interconnected between said actuating device and said reflective element; and third means for limiting the light rays intersecting a first such area of such sheet of photographic material to those from such subject and for limiting the light rays intersecting a second such area of such sheet of photographic material to those from such data card.

15. The camera system of claim 14 wherein said first means includes an electronic flash unit positioned to illuminate such data card when appropriately energized and means for selectively energizing said flash unit and wherein said camming arrangement is adapted to activate said energizing means responsive to the operation of said actuating device.

16. A camera system for recording an image of a subject positioned exteriorly of said system and information presented on a data card mounted within said system on mutually exclusive areas of a sheet of photographic material, comprising:

an objective lens adapted to form an image of such subject on such sheet of photographic material;

first means for forming an image of such data card on such sheet of photographic material, said first means including a displaceably mounted light reflective element positioned in the optical path between said objective lens and such sheet of photographic material so as to preclude the formation of an image of such subject on such sheet of photographic material at such times while facilitating the formation of an image of such data card on such sheet of photographic material at such times, said light reflective element thereby precluding the simultaneous formation of a composite record of such subject and such data card on such sheet of photographic material;

second means for selectively displacing said reflective element out of such optical path after an image of such data card has been formed on such sheet of photographic material to facilitate the subsequent formation of an image of such subject on such sheet of photographic material; and third means for limiting the light rays intersecting a first such area of such sheet of photographic material to those from such subject and for limiting the light rays intersecting a second such area of such sheet of photographic material to those from such data card.

17. The system of claim 16 additionally comprising fourth means for preventing light rays from being reflected by said light reflective element when located in its said second position.

18. The camera system of claim 16 wherein said second means comprises an actuating device accessible exteriorly of said system for manual operation and a camming mechanism interconnected between said actuating device and said reflective element.

19. The system of claim 18 wherein said third means comprises a first polarizer positioned to intercept substantially all of the light rays passing through said objective lens from such subject, a second polarizer having its transmission axis orthogonally aligned with that of said first polarizer positioned to intercept substantially all of the light rays directed towards such sheet of photographic material from such data card and a polarizing sheet mounted for displacement between a first position spaced from such sheet of photographic material into a second position adjacent to and overlying said sheet of photographic material having a first section with the same transmission axis as that of said first polarizer adapted to overlie such first area and a second section with the same transmission axis as that of said second polarizer adapted to overlie such second area and wherein said camming device is operably associated with said polarizing sheet to effect the displacement of said polarizing sheet into its said second position prior to effecting such displacement of said reflective element.

20. A camera system for recording an image of a subject positioned exteriorly of said system and an image of data card mounted interiorly of said system on mutually exclusive areas of a sheet of photographic material, comprising:

first means for mounting such sheet of photographic material;

a first objective lens adapted to form an image of such subject on such sheet of photographic material;

a shutter operably associated with said lens;

second means for mounting such data card; third means for forming an image of such data card on such sheet of photographic material, including:

a flash unit positioned to illuminate such data card when appropriately energized;

a first light reflective element fixedly positioned with respect to such data card;

a second light reflective element mounted for displacement between a first position, located in the optical path between said first lens and such sheet of photographic material to receive light rays from such data card and reflected by said first reflective element and to reflect such light rays onto such sheet of photographic material, and a second position, located out of such optical path;

fourth means for preventing light rays from being reflected by said light reflective element when located in its said second position; and a second objective lens positioned in operable relationship with such light rays adapted to focus an image of such data card on such sheet of photographic material;

a first polarizer positioned to intercept substantially all of the light rays passing through said first lens from such subject;

a second polarizer having its transmission axis orthogonally aligned with that of said first polarizer positioned to intercept substantially all of the light rays passing through said second lens from such data card;

a polarizing sheet having a first section with a transmission axis similar to that of said first polarizer adapted to overlie a first such area of such sheet of photographic material on which such image of such subject is intended to be formed and a second section with a transmission axis the same as that of said second polarizer adapted to overlie a second such area of such sheet of photographic material on which such image of such data card is intended to be formed; and fourth means for first energizing said flash unit, next displacing said second light reflective element into its said second position and then activating said shutter whereby an image of such data card and such subject are sequentially formed on such first and second areas of such sheet of photographic material.

21. The camera system of claim 18 wherein said polarizing sheet is mounted for displacement between a first position spaced from such sheet of photographic material into a second position adjacent to and overlying said sheet of photographic material and said fourth means additionally includes means for displacing said polarizing sheet from its said first position into its said second position prior to energizing said flash unit.

22. The system of claim 21 wherein said fourth means includes an actuating device accessible exteriorly of said system for manual operation and a camming mechanism interconnected between said actuating device and said polarizing sheet, said flash unit, said second reflective element and said shutter.

23. The system of claim 22 wherein said camming mechanism includes a rotably mounted cam having first and second projecting surfaces and a cammed track and the mounting means for said polarizing sheet includes a spring biasing said polarizing sheet towards such sheet of photographic material and a projection adapted to be engaged by said first projecting surface when said polarizing sheet is in its said first position, and wherein said second light reflective element is pivotably mounted and additionally including a pin mounted from said second light reflective element and extending into engagement with said cammed track and wherein said energizing means of said fourth means includes a microswitch positioned to be engaged by said second projecting surface, and said shutter is connected to said cam, whereby operation of said actuating means causes said cam to be rotated in the process of which said first projecting surface permits said polarizing sheet to be displaced into its said second position under the force exerted thereon by said spring, said second projecting surface then engages said microswitch, said second light reflective surface is next displaced into its said second position and finally said shutter is activated.

24. A camera system for recording an image of a subject positioned exteriorly of said system and information presented on a data card mounted within said system on mutually exclusive areas of a sheet of photographic material, comprising:

an objective lens adapted to form an image of such subject on such sheet of photographic material;

first means for forming an image of such data card on such sheet of photographic material, said first means including a displaceably mounted light reflective element positioned in the optical path between said objective lens and such sheet of photographic material, said light reflective element thereby precluding the simultaneous formation of a composite record of such subject and such data card on such sheet of photographic material;

second means for selectively displacing said reflective element out of such optical path to facilitate the formation of an image of such subject on such sheet of photographic material;

third means for limiting the light rays intersecting a first such area of such sheet of photographic material to those from such subject and for limiting the light rays intersecting a second such area of such sheet of photographic material to those from such data card; and fourth means for preventing light rays from being reflected by said light reflective element when located in its second position.

25. A camera system for recording an image of a subject positioned exteriorly of said system and information presented on a data card mounted within said system on mutually exclusive areas of a sheet of photographic material, comprising:

an objective lens adapted to form an image of such subject on such sheet of photographic material;

first means for forming an image of such data card on such sheet of photographic material, said first means including a displaceably mounted light reflective element positioned in the optical path between said objective lens and such sheet of photographic material;

second means for selectively displacing said reflective element out of such optical path to facilitate the formation of an image of such subject on such sheet of photographic material, said second means comprising an actuating device accessible exteriorly of said system for manual operation;

third means for limiting the light rays intersecting a first such area of such sheet of photographic material to those from such subject and for limiting the light rays intersecting a second such area of such sheet of photographic material to those from such data card, said third means including a first polarizer positioned to intercept substantially all of the light rays passing through said objective lens from such subject, a second polarizer having a transmission axis orthogonally aligned with respect to that of said first polarizer positioned to intercept substantially all of the light rays directed towards such sheet of photographic material from such data card, and a polarizing sheet mounted for displacement between a first position spaced from such sheet of photographic material into a second position in contact with and overlying such sheet of photographic material, said polarizing sheet having a first section adapted to overlie such first area having the same transmission axis as that of said first polarizer and a second section adapted to overlie such second area having the same transmission axis as that of said second polarizer; and a shutter operably associated with said objective lens, said actuating device being operably associated with said polarizing sheet, said shutter and said reflective element to first effect the displacement of said polarizing sheet into its said second position and to subsequently sequentially effect the displacement of said reflective element and the actuation of said shutter.

26. Apparatus for sequentially recording images of two scenes on a sheet of photographic material, comprising:

first means for forming an image of one of such scenes on such sheet of photographic material, said first means defining an optical path for light rays from such one scene within said apparatus;

second means for forming an image of the other of such scenes on such sheet of photographic material, said second means including a light reflective element positioned in such optical path so as to preclude an image of such one scene from being formed on such sheet of photographic material at such times while facilitating the formation of an image of such other scene on such sheet of photographic material at such times and adapted to be displaced into a second position out of such optical path to facilitate the formation of such image of such one scene on such sheet of photographic material, said light reflective element thereby precluding the simultaneous formation of a composite photographic record of such two scenes on such sheet of photographic material; and third means for selectively displacing said reflective element into and out of such optical path.

27. The apparatus of claim 26 additionally comprising fourth means for preventing light rays from being reflected by said light reflective element when located in its said second position.

28. The apparatus of claim 26 wherein said apparatus facilitates the sequential recording of images of such two scenes on mutually exclusive areas of such sheet of photographic material and additionally including fourth means for limiting the light rays intersecting a first such area of such sheet of photographic material to those from such one scene and for limiting the light rays intersecting a second such area of such sheet of photographic material to those from such other scene.

29. The system of claim 28 wherein said fourth means comprises light filtering material.

30. The invention of claim 28 wherein said fourth means is positioned adjacent to and overlies such mutually exclusive areas of such sheet of photographic material.

* * * * *